US012020579B2

(12) United States Patent
Krenz et al.

(10) Patent No.: US 12,020,579 B2
(45) Date of Patent: Jun. 25, 2024

(54) SYSTEM AND METHOD FOR FLYING AIRCRAFT RELATIVE TO LEAD AIRCRAFT

(71) Applicant: Rockwell Collins, Inc., Cedar Rapids, IA (US)

(72) Inventors: Michael J. Krenz, Roscoe, IL (US); Stefano Riverso, Cork City (IE); Ellen L. McGaughy, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 260 days.

(21) Appl. No.: 17/334,107

(22) Filed: May 28, 2021

(65) Prior Publication Data

US 2022/0383756 A1 Dec. 1, 2022

(51) Int. Cl.
*G08G 5/00* (2006.01)
*G08G 5/06* (2006.01)
*B64D 43/00* (2006.01)

(52) U.S. Cl.
CPC ......... *G08G 5/0021* (2013.01); *G08G 5/0013* (2013.01); *G08G 5/0039* (2013.01); *G08G 5/065* (2013.01); *B64D 43/00* (2013.01)

(58) Field of Classification Search
CPC .. G08G 5/0021; G08G 5/0013; G08G 5/0039; G08G 5/065; G08G 5/0008; G08G 5/0034; G08G 5/0043; B64D 43/00; B64U 2201/10
See application file for complete search history.

(56) References Cited

U.S. PATENT DOCUMENTS

| 6,393,358 B1* | 5/2002 | Erzberger | G08G 5/0043 701/122 |
| 6,438,468 B1 | 8/2002 | Muxlow et al. | |
| 6,584,400 B2* | 6/2003 | Beardsworth | G08G 5/0043 701/120 |
| 6,587,757 B2* | 7/2003 | Sainthuile | G05D 1/104 701/1 |

(Continued)

FOREIGN PATENT DOCUMENTS

| CN | 110347073 A | 10/2019 |
| EP | 2559018 A4 | 1/2014 |

(Continued)

*Primary Examiner* — Mussa A Shaawat
(74) *Attorney, Agent, or Firm* — Suiter Swantz pc llo

(57) ABSTRACT

A system may include an aircraft including a processor. The processor may be configured to: receive a lead aircraft assignment instruction, the lead aircraft assignment instruction instructing the aircraft to follow a lead aircraft; determine whether the aircraft is receiving sufficient lead aircraft traffic data from the lead aircraft to record a four-dimensional (4D) track of the lead aircraft; upon a determination that the aircraft is receiving the sufficient lead aircraft traffic data, output an acceptance of the lead aircraft assignment instruction; receive the lead aircraft traffic data from the lead aircraft, the lead aircraft traffic data including information at least one of associated with or of the track of the lead aircraft; record the track of the lead aircraft; and output commands configured to cause (a) the aircraft to follow the recorded track, or (b) guidance content for following the recorded track of the lead aircraft to be presented.

13 Claims, 11 Drawing Sheets

(56) References Cited

U.S. PATENT DOCUMENTS

| | | | |
|---|---|---|---|
| 7,248,963 B2 * | 7/2007 | Baiada | G08G 5/025 342/36 |
| 7,412,324 B1 * | 8/2008 | Bagge | G08G 5/0008 342/36 |
| 7,912,593 B2 * | 3/2011 | Ridenour | G08G 5/025 701/3 |
| 8,014,907 B2 | 9/2011 | Coulmeau | |
| 8,108,088 B2 | 1/2012 | Closse et al. | |
| 8,112,224 B2 | 2/2012 | Lucas et al. | |
| 8,386,158 B2 | 2/2013 | Blanchon et al. | |
| 8,849,476 B2 | 9/2014 | Coulmeau | |
| 8,935,016 B2 | 1/2015 | Raynaud et al. | |
| 9,424,754 B2 | 8/2016 | Srivastav et al. | |
| 9,697,737 B2 | 7/2017 | Hale et al. | |
| 10,163,356 B2 | 12/2018 | Britan et al. | |
| 10,339,817 B1 * | 7/2019 | McGaughy | G08G 5/0021 |
| 2004/0075586 A1 * | 4/2004 | Glover | G08G 5/025 340/963 |
| 2006/0200279 A1 * | 9/2006 | Ainsworth | G08G 5/025 701/16 |
| 2018/0089247 A1 | 3/2018 | Kim et al. | |
| 2019/0213890 A1 * | 7/2019 | Hosamani | B64D 45/08 |
| 2020/0111371 A1 | 4/2020 | Roger et al. | |
| 2020/0124441 A1 | 4/2020 | Miller et al. | |
| 2020/0273356 A1 | 8/2020 | Raynaud et al. | |
| 2021/0241630 A1 * | 8/2021 | Nicholls | B64D 43/02 |
| 2022/0262264 A1 * | 8/2022 | Turcios | G08G 5/0021 |

FOREIGN PATENT DOCUMENTS

| | | |
|---|---|---|
| EP | 2993655 B1 | 12/2017 |
| EP | 2650738 B1 | 8/2018 |
| EP | 3118579 B1 | 1/2020 |
| EP | 3104358 B1 | 8/2020 |
| EP | 3764340 A1 | 1/2021 |
| GB | 2540010 A | 1/2017 |

\* cited by examiner

| Waypoint | Altitude/ VS | Heading/ Turn Rate | Speed | Notes |
|---|---|---|---|---|
| MSN | 14000 | | 300 | |
| OBK | 10000 | | 250 | Leg interrupted by clearance direct to MTS_1 |
| MTS_1 | 8000/ -500 | | 200 | |
| MTS | | | | Maintain Track & Separation (ref UA510) |
| MTS_9 | 7000 | 110 | 140 | |
| ILS 9L/ VNDER | 7000 | | 135 | Standard ILS 9L procedure with entry at VNDER waypoint |

FIG. 9

SYSTEM AND METHOD FOR FLYING AIRCRAFT RELATIVE TO LEAD AIRCRAFT

BACKGROUND

Today's air traffic control (ATC) system is largely done on an individual aircraft-by-aircraft basis. Each aircraft is independently cleared for a route of flight and independently controlled by ATC. With many complex routes being flown by many aircraft on the same day, this can be highly inefficient from a voice control perspective. Listening to an arrival frequency at a busy hub airport is similar to listening to a recording of the ATC at 5 to 10 minute intervals but with different voices responding each time.

SUMMARY

In one aspect, embodiments of the inventive concepts disclosed herein are directed to a system. The system may include system may include an aircraft including a processor. The processor may be configured to: receive a lead aircraft assignment instruction from air traffic control (ATC), the lead aircraft assignment instruction instructing the aircraft to follow a lead aircraft assigned in the lead aircraft assignment instruction; determine whether the aircraft is receiving sufficient lead aircraft traffic data from the lead aircraft or the ATC to record a track of the lead aircraft, the track being a four-dimensional (4D) track; upon a determination that the aircraft is receiving the sufficient lead aircraft traffic data from the lead aircraft or the ATC to record the track of the lead aircraft, output an acceptance of the lead aircraft assignment instruction for transmission to the ATC; receive the lead aircraft traffic data obtained from the lead aircraft or the ATC, the lead aircraft traffic data including information at least one of associated with or of the track of the lead aircraft, the track including information of a ground track of the lead aircraft at given times, altitudes of the lead aircraft at the given times, and speeds of the lead aircraft at the given times; record the track of the lead aircraft based on the lead aircraft traffic data; and output commands, the commands configured to cause at least one of: (a) the aircraft to follow the recorded track of the lead aircraft, or (b) guidance content to be presented to a pilot of the aircraft, the guidance content including information associated with guidance for following the recorded track of the lead aircraft.

In a further aspect, embodiments of the inventive concepts disclosed herein are directed to a system. The system may include system may include an aircraft including a processor. The processor may be configured to: receive an instruction from air traffic control (ATC), the instruction instructing the aircraft to follow a virtual lead aircraft assigned in the instruction; output an acceptance of the instruction for transmission to the ATC; obtain virtual lead aircraft track data, the virtual lead aircraft data including information at least one of associated with or of a track of the virtual lead aircraft, the track being a four-dimensional (4D) track, the track including information of a ground track of the virtual lead aircraft at given times, altitudes of the virtual lead aircraft at the given times, and speeds of the virtual lead aircraft at the given times; and output commands, the commands configured to cause at least one of: (a) the aircraft to follow the track of the virtual lead aircraft, or (b) guidance content to be presented to a pilot of the aircraft, the guidance content including information associated with guidance for following the track of the virtual lead aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9 is an exemplary view of a table of an exemplary embodiment according to the inventive concepts disclosed herein.

DETAILED DESCRIPTION

Figure 1:
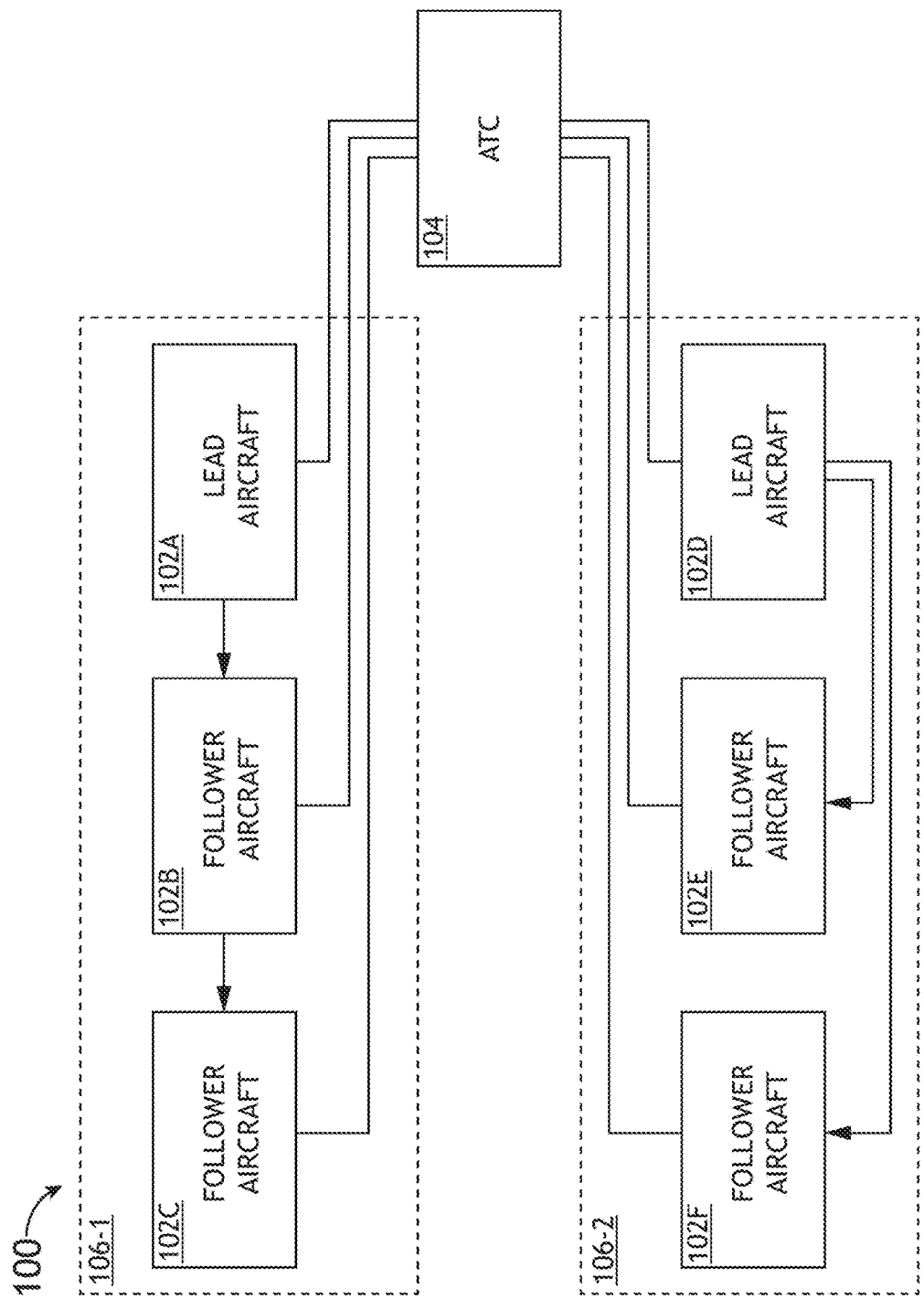
FIG. 1 is a view of an exemplary embodiment of a system including aircraft and an air traffic control (ATC) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to cause (a) an aircraft to follow a track of a lead aircraft (e.g., a real lead aircraft or a virtual lead aircraft), and/or (b) guidance content to be presented to a pilot of the aircraft, the guidance content including information associated with guidance for following the track of the lead aircraft.

Some embodiments may enable at least one aircraft to be "cleared" to fly relative to a lead aircraft and/or a four-dimensional (4D) route defined by a recorded lead aircraft flight path (e.g., a track) or an accessed virtual lead aircraft flight path. A lead aircraft may be selected by ATC as early as push back and/or departure clearance at the lead aircraft's originating airport. The lead aircraft may be selected based on any of several factors, such as how well-equipped the lead aircraft is from a navigation perspective and/or the lead aircraft's ability to fly optimized flight profiles, which the follower aircraft would then duplicate. The ordering of the lead aircraft and at least one follower aircraft may also be determined by the ATC(s) (e.g., by ground operations) at either or both of the departure and arrival airports to minimize delays during taxi, etc. The type of clearance issued for the portion of the flight that involves leader/follower 4D track matching may be referred to as "maintain track and separation" (MTS).

A "maintain track and separation" (MTS) clearance may clear an aircraft to follow a 4D track of another aircraft (e.g., a lead aircraft) such that the aircraft maintains the same ground track, altitude and speeds of the lead aircraft, or an uplinked 4D route of a virtual lead aircraft. For example, the uplinked 4D route may be a "recording" of a prior aircraft's path that the ATC controller stored and forwarded to the aircraft thereby creating a virtual lead aircraft. Further, for example, the uplinked 4D route may be computer generated and forwarded to the aircraft thereby creating the virtual lead aircraft. MTS may be used during any flight procedure, such as taxi (which may be slightly modified to be more of a follow-me route with dynamic runway hold short instructions inserted), climb, cruise, descent, and/or approach.

In some embodiments, arrival sequencing into major airports is one possible scenario for MTS type of clearances. For this type of clearance, the lead aircraft may receive "standard" vectors and fly the procedures as usual. The follower aircraft may receive the lead aircraft's aircraft traffic data (e.g., automatic dependent surveillance-broadcast (ADS-B) data) and dynamically plot a 4D path (e.g., a track) that the follower aircraft would then follow (e.g., horizontal, vertical, and speed) with a specified time offset (e.g., relative to the lead aircraft, or relative to crossing a first point in the MTS segment).

For example, ATC may vector the lead aircraft as usual, and clear the follower aircraft reference to the lead aircraft they are following. For example, ATC's instructions might be as follows: "AA64 (e.g., American Airlines flight 64; a follower aircraft) cleared to VNDER (e.g., a waypoint), via Maintain Track & Separation (MTS) relative to UA510 (e.g., United Airlines flight 510; a lead aircraft)" which would initiate capturing the current location of UA510, flying to that location and following from there until VNDER. As another example, ATC's instructions might be as follows: "AA64 cleared to VNDER via instrument landing system (e.g., ILS 9L) location MTS_1" which would be a clearance direct to location MTS_1, and to follow an uplinked 4D guidance from there until VNDER with a time offset that starts when the follower aircraft hits location MTS_1. As a further example, ATC's instructions might be as follows: "AA64 cleared to VNDER, upon intercept of UA510 track, maintain track & separation relative to UA510" which would indicate that AA64 is to continue on its present clearance (e.g., heading, altitude, speed, etc.) until intercepting the UA510 track, and then follow lead aircraft's track. In some embodiments, some restrictions may be instituted, such as a required time of arrival at location MTS_1, and/or possibly specifying a time or distance offset behind UA510. For example, a digital clearance specifying a time interval may be as follows: "AA64 Cleared to VNDER, via Maintain Track & Separation relative to UA510 plus 7 minutes"; such ATC instructions would tell AA64 to start following the track of UA510 at a point where AA64 would be 7 minutes behind UA510 and then maintain the same 4D path until VNDER. In some embodiments, if UA510 is slowing down, the distance will close even if AA64 follows the same 4D track with a time offset. Therefore, the ATC may use a tool (e.g., a Terminal radar approach control (TRACON) tool, a Final Approach Spacing (FAST) tool, and/or an air route traffic control centers (ARTCCs) tool) that dynamically predicts the "final approach" separation, which can be used for some embodiments when assigning a maintain track and separation type clearance. These types of tools for dynamically predicting the "final approach" separation are well known to those of skill in the art. Also, a computing device onboard the follower aircraft may continuously monitor the 4D track to assure that minimum separation standards (e.g., both time and distance) are not violated.

In some embodiments, a flight management system (FMS) computing device of the follower aircraft may host the track (e.g., the track of the lead aircraft or virtual lead aircraft), as well as outer loop guidance function onboard the follower aircraft, although the track may also be stored by an offboard system, such as on the ground (e.g., at ATC), and data-linked from the offboard system to the follower aircraft as needed.

In some embodiments, if a lead aircraft and follower aircraft methodology, as disclosed throughout, were to be adopted, there may be an additional challenge in picking an appropriate lead aircraft. For example, such selection may be done as part of a push back and departure procedure to pick a best available lead aircraft long before actual sequencing begins during flights.

Some embodiments may enable aircraft to fly formations to obtain benefits of wake surfing, as well as MTS "Follow Me" paths. Additionally, some embodiments may alleviate some of the workload on Air Traffic Control by reducing the number of "discrete" aircraft under positive control at a given time. Some embodiments may also provides a means for aircraft to self-separate and sequence on a dynamically defined common route, much like a locomotive pulls a train, which may reduce controller workload and potentially offer more efficient flight paths and more optimal runway and/or landing zone usage. In some embodiments, the follower aircraft may receive the ADS-B transmissions directly from a lead aircraft and then autonomously mimic the route flown by the lead aircraft. In some embodiments, the follower aircraft may have the ability to follow a lead aircraft that has not yet completed a full procedure. In some embodiments, selection of a lead aircraft involves processing of proposed flight plans and prediction of sequencing en route and at arrival. Additionally, in some embodiments, the controller may specify a point for a follower aircraft to start following a lead aircraft relative to a historical track of the lead aircraft.

Referring now to FIGS. 1, 2, 3, 4, 5, and 6, an exemplary embodiment of a system 100 according to the inventive concepts disclosed herein is depicted. As shown in FIG. 1, in some embodiments, the system 100 may include a plurality of aircraft 102 (e.g., 102A, 102B, 102C, 102D, 102E, and/or 102F) and at least one ATC 104, some or all of which may be communicatively coupled at any given time. In some embodiments, the aircraft 102 may form trains 106-1, 106-2. For example, a first train 106-1 may include a lead aircraft 102A and at least one follower aircraft (e.g., 102B and 102C). The follower aircraft 102B may also serve as a lead aircraft for the follower aircraft 102C. For example, a second train 106-1 may include a lead aircraft 102D and at least one follower aircraft (e.g., 102E and 102F). The lead aircraft 102D may serve a lead aircraft for both of the follower aircraft 102E, 102F.

Figure 2:
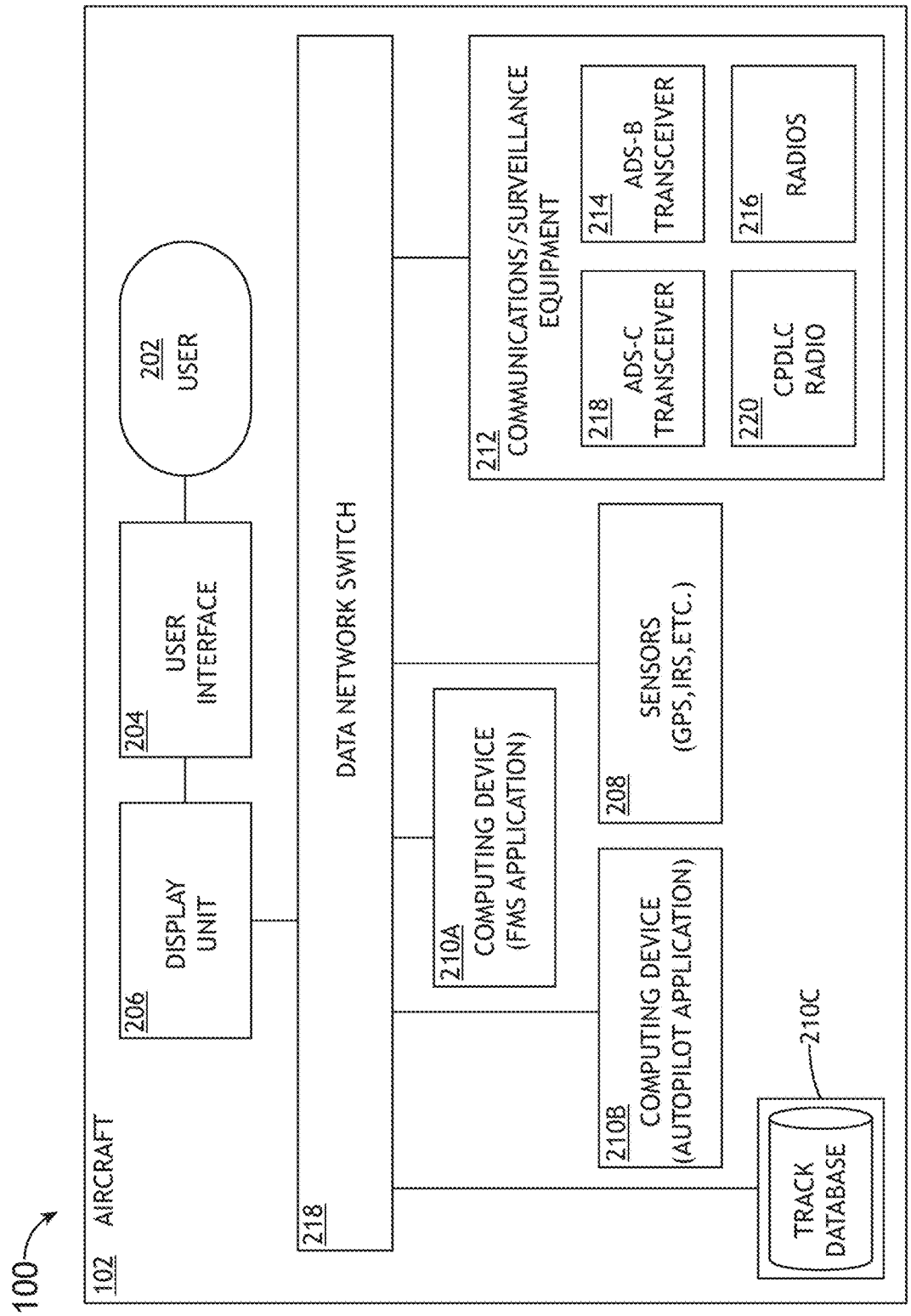
FIG. 2 is a view of an exemplary embodiment of the aircraft of FIG. 1 according to the inventive concepts disclosed herein.
Figure 3:
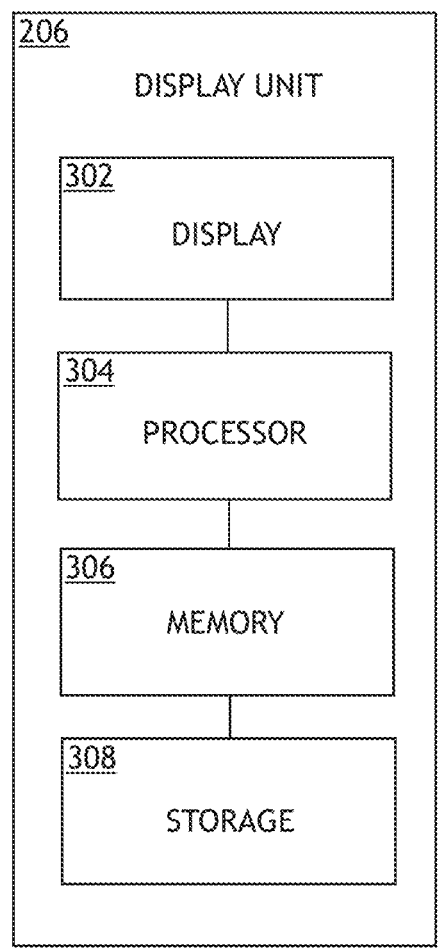
FIG. 3 is a view of an exemplary embodiment of the display unit computing device of FIG. 2 according to the inventive concepts disclosed herein.
Figure 4:
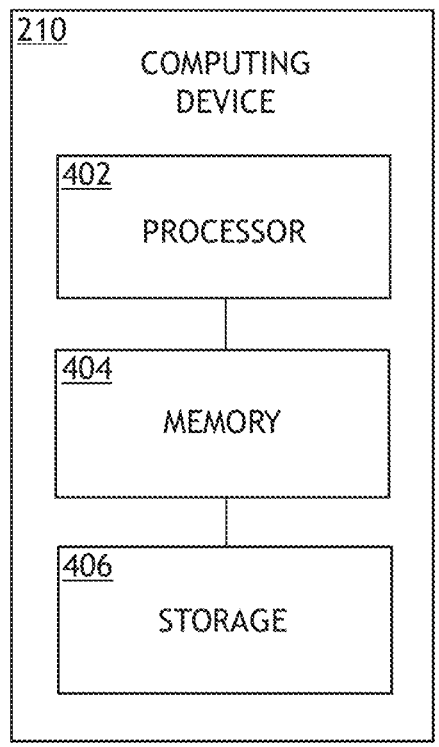
FIG. 4 is a view of an exemplary embodiment of a computing device of FIG. 2 according to the inventive concepts disclosed herein.

For example, as shown in FIGS. 2, 3, and 4, one, some, or all of the aircraft 102 may include at least one user 202, at least one user interface 204, at least one display unit computing device 206, sensors 208, at least one computing device 210A, at least one computing device 210B, at least one computing device 210C, communications and/or surveillance equipment 212, and/or a data network switch 218, some or all of which may be communicatively coupled at any given time, such as via the data network switch 218. In some embodiments, the at least one display unit computing device 206, the at least one computing device 210A, the at least one computing device 210B, and/or the at least one computing device 210C may be implemented as a single computing device or any number of computing devices configured to perform any or all of the operations disclosed throughout. In some embodiments, some or all of the at least one user 202, the at least one user interface 204, the at least one display unit computing device 206, the at least one computing device 210A, the at least one computing device 210B, and/or the at least one computing device 210C may be implemented onboard the aircraft 102. In some embodiments, the at least one user 202 (e.g., a remote pilot or remote crewmember), the at least one user interface 204, the at least one display unit computing device 206, the at least one computing device 210A, the at least one computing device 210B, and/or the at least one computing device 210C may be implemented offboard of the aircraft 102, for example, if a given aircraft 102 is a remote piloted aircraft (e.g., an unmanned aerial vehicle (UAV) or a drone aircraft).

The user 202 may be a pilot, a remote pilot, a crew member, or a remote crew member. The user 202 may be configured to interface with the system via the user interface 204, for example, to engage, disengage, terminate, or override MTS clearance and/or MTS operations, or to acknowledge, accept, or reject lead aircraft assignment instructions received from ATC 104. The at least one user interface 204 may be implemented as any suitable user interface, such as a touchscreen (e.g., of the display unit computing device 206 and/or another display unit), a multipurpose control panel, a cursor control panel, a keyboard, a mouse, a trackpad, a button, a switch, an eye tracking system, and/or a voice recognition system. The user interface 204 may be configured to receive a user selection and to output the user selection to a computing device (e.g., the display unit computing device 206).

Figure 7:
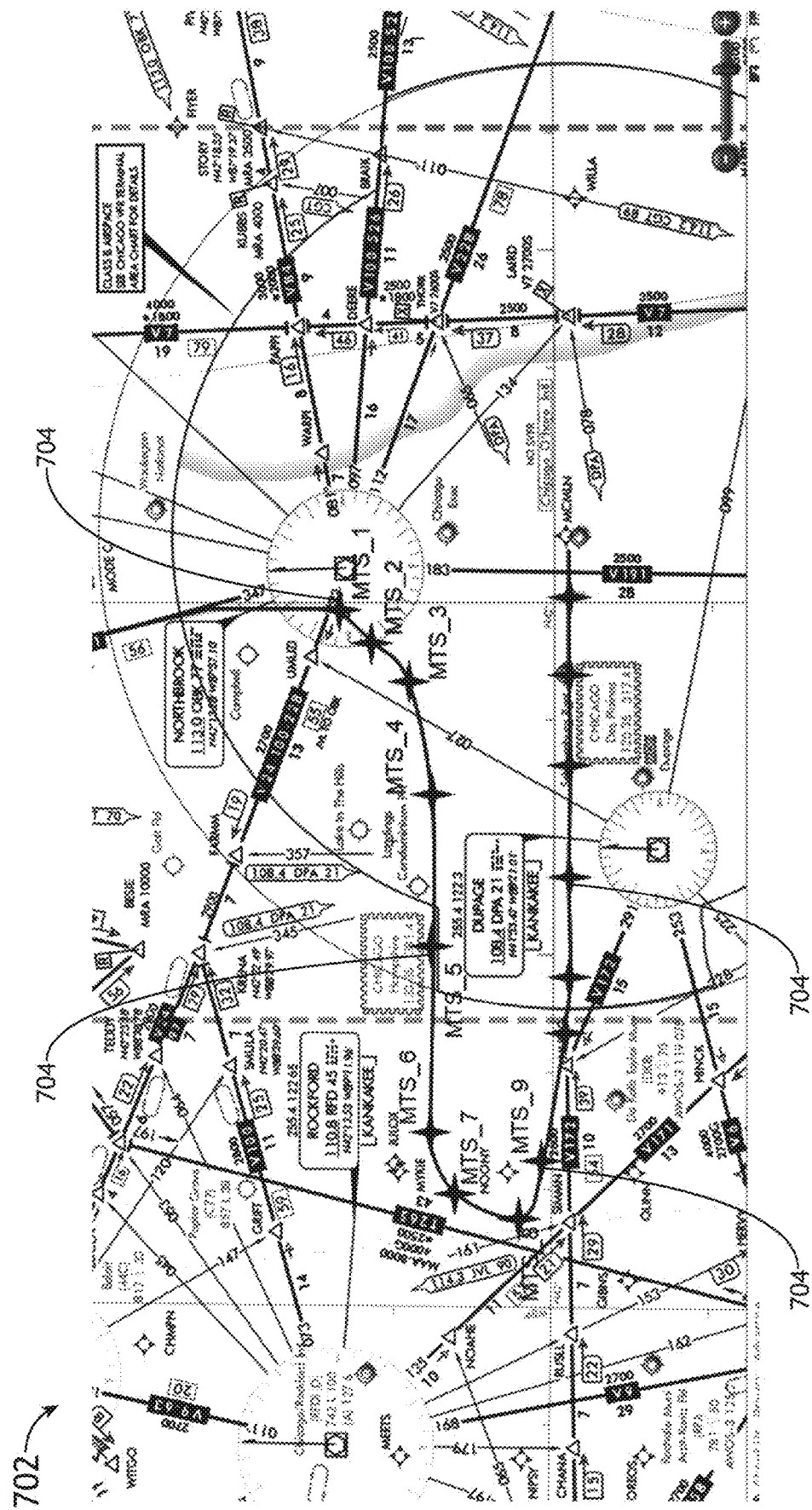
FIG. 7 is an exemplary view of a flight map of an exemplary embodiment according to the inventive concepts disclosed herein.

The display unit computing device 206 may be implemented as any suitable computing device, such as a multi-function window (MFW) computing device, which may display views of maps, among other suitable things. As shown in FIG. 3, the display unit computing device 206 may include at least one display 302, at least one processor 304, at least one memory 306, and/or storage 308, some or all of which may be communicatively coupled at any given time. For example, the at least one processor 304 may include at least one general purpose processor (e.g., at least one central processing unit (CPU)), at least one digital signal processor (DSP), at least one application specific integrated circuit (ASIC), and/or at least one field-programmable gate array (FPGA). The processor 304 may be configured to run various software applications (e.g., a map window application) or computer code stored (e.g., maintained) in a non-transitory computer-readable medium (e.g., memory 306 and/or storage 308) and configured to execute various instructions or operations. The processor 304 may be configured to perform any or all of the operations disclosed throughout. For example, the processor 304 may be configured to: receive sensor data from the sensors 208; execute the map window application; receive data and views of maps (e.g., as shown in FIGS. 7 and/or 8); receive guidance content data (e.g., including information associated with guidance for following a track (e.g., a recorded track or a virtual track) of a lead aircraft (e.g., a real lead aircraft or a virtual lead aircraft)); output the views of the maps to the display 302; and/or output the guidance content to the display 302. The display 302 may be configured to: present the views of the maps; and/or present the guidance content.

The sensors 208 may be any suitable sensors configured to output sensor data to another computing device (e.g., 206, 210A, 210B, and/or 210C). For example, the sensors 208 may include any or all of the following: at least one global positioning system (GPS) sensor; at least one inertial reference system (IRS) sensor; at least one throttle position sensor; at least one aircraft position sensor; at least one groundspeed sensor; and/or any other sensors commonly installed in aircraft. The sensors 208 may be configured to output sensor data (e.g., aircraft three-dimensional (3D) position and/or speed) to some or all of the computing devices (e.g., 206, 210A, 210B, and/or 210C) and/or the communications and/or surveillance equipment 212.

The computing device 210A may be implemented as any suitable computing device, such as a flight management system (FMS) computing device and/or a flight data computer. As shown in FIG. 4, the computing device 210A may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an FMS application) or computer code stored (e.g., maintained) in a non-transitory computer-readable medium (e.g., memory 404 and/or storage 406) and configured to execute various instructions or operations. The processor 402 of the computing device 210A may be configured to perform any or all of the operations disclosed throughout.

For example, the processor 402 of the computing device 210A may be configured to: receive sensor data from the sensors 208; receive a lead aircraft assignment instruction from air traffic control (ATC) 104, the lead aircraft assignment instruction instructing the aircraft (e.g., 102B, 102C, 102E, or 102F) to follow a lead aircraft (e.g., 102A or 102D) assigned in the lead aircraft assignment instruction; determine whether the aircraft (e.g., 102B, 102C, 102E, or 102F) is receiving sufficient lead aircraft traffic data from the lead aircraft (e.g., 102A or 102D) to record a track of the lead aircraft (e.g., 102A or 102D); upon a determination that the aircraft (e.g., 102B, 102C, 102E, or 102F) is receiving the sufficient lead aircraft traffic data from the lead aircraft (e.g., 102A or 102D) to record the track of the lead aircraft (e.g., 102A or 102D), output an acceptance of the lead aircraft assignment instruction for transmission to the ATC 104; receive the lead aircraft traffic data obtained from the lead aircraft (e.g., 102A or 102D), the lead aircraft traffic data including information at least one of associated with or of a track of the lead aircraft (e.g., 102A or 102D), the track including information of a ground track of the lead aircraft (e.g., 102A or 102D) at given times, altitudes of the lead aircraft (e.g., 102A or 102D) at the given times, and speeds of the lead aircraft (e.g., 102A or 102D) at the given times; record the track of the lead aircraft (e.g., 102A or 102D) based on the lead aircraft traffic data; output commands, the commands configured to cause at least one of: (a) the aircraft (e.g., 102B, 102C, 102E, or 102F) to follow the recorded track of the lead aircraft (e.g., 102A or 102D), or (b) guidance content to be presented to a pilot (e.g., 202) of the aircraft (e.g., 102B, 102C, 102E, or 102F), the guidance content including information associated with guidance for following the recorded track of the lead aircraft (e.g., 102A or 102D); and/or terminate output of the commands upon at least one of: a manual intervention, an assignment of a new lead aircraft, upon a transition to a different flight procedure (e.g., an approach procedure, a departure procedure, an en route procedure, an arrival procedure, a direct-to procedure, or a traversing Free Route Airspace procedure).

In some embodiments, aircraft traffic data (e.g., lead aircraft traffic data) may be and/or may include automatic dependent surveillance-broadcast (ADS-B) data.

In some embodiments, the lead aircraft assignment instruction further instructs the aircraft (e.g., 102B, 102C, 102E, or 102F) to follow the track of the lead aircraft (e.g., 102A or 102D) with a specified separation to maintain between the aircraft (e.g., 102B, 102C, 102E, or 102F) and the lead aircraft (e.g., 102A or 102D), wherein the commands are further configured to cause at least one of: (a) the aircraft (e.g., 102B, 102C, 102E, or 102F) to follow the recorded track of the lead aircraft (e.g., 102A or 102D) with the specified separation to maintain between the aircraft (e.g., 102B, 102C, 102E, or 102F) and the lead aircraft (e.g., 102A or 102D), or (b) guidance content to be presented to a pilot of the aircraft (e.g., 102B, 102C, 102E, or 102F), the guidance content including information associated with guidance for following the recorded track of the lead aircraft (e.g., 102A or 102D) with the specified separation to maintain between the aircraft (e.g., 102B, 102C, 102E, or 102F) and the lead aircraft (e.g., 102A or 102D). In some embodiments, the lead aircraft assignment instruction further instructs the aircraft (e.g., 102B, 102C, 102E, or 102F) to begin following the recorded track of the lead aircraft (e.g., 102A or 102D) at a specified location (e.g., a waypoint) or to begin following a segment of the recorded track to another specified location. In some embodiments, the specified separation is a specified time offset separation. In some embodiments, the specified separation is a specified distance offset separation. For example, the lead aircraft assignment instruction instructing the aircraft (e.g., 102B, 102C, 102E, or 102F) to follow the track of the lead aircraft (e.g., 102A or 102D) with a specified separation to maintain between the aircraft (e.g., 102B, 102C, 102E, or 102F) and the lead aircraft (e.g., 102A or 102D) may be referred to as an MTS instruction.

In some embodiments, where there is a train (e.g., 106-2) including two or more follower aircraft (e.g., aircraft 102E and second aircraft 102F) and a lead aircraft (e.g., 102D), each of the two or more follower aircraft (e.g., 102E and 102F) may include a processor 402 of a computing device 210A. For example, the processor 402 (e.g., a second aircraft processor) of the second follower aircraft (e.g., 102F) may be configured to: receive a second lead aircraft assignment instruction from the ATC 104, the second lead aircraft assignment instruction instructing the second aircraft (e.g., 102F) to follow the lead aircraft (e.g., 102D) assigned in the second lead aircraft assignment instruction; determine whether the second aircraft (e.g., 102F) is receiving sufficient lead aircraft traffic data from the lead aircraft (e.g., 102D) to record the track of the lead aircraft (e.g., 102D); upon a determination that the second aircraft (e.g., 102F) is receiving the sufficient lead aircraft traffic data from the lead aircraft (e.g., 102D) to record the track of the lead aircraft (e.g., 102D), output an acceptance of the second lead aircraft assignment instruction for transmission to the ATC 104; receive the lead aircraft traffic data obtained from the lead aircraft (e.g., 102D), the lead aircraft traffic data including the information at least one of associated with or of the track of the lead aircraft (e.g., 102D), the track including the information of the ground track of the lead aircraft (e.g., 102D) at the given times, the altitudes of the lead aircraft (e.g., 102D) at the given times, and the speeds of the lead aircraft (e.g., 102D) at the given times; record the track of the lead aircraft (e.g., 102D) based on the lead aircraft traffic data; and/or output commands, the commands configured to cause at least one of: (a) the second aircraft (e.g., 102F) to follow the recorded track of the lead aircraft (e.g., 102D), or (b) guidance content to be presented to a pilot (e.g., 202) of the second aircraft (e.g., 102F), the guidance content including information associated with guidance for following the recorded track of the lead aircraft (e.g., 102D). In some embodiments, the second lead aircraft assignment instruction is received by the second aircraft (e.g., 102F) within 30 minutes (e.g., within 10 minutes, within 5 minutes, within 2 minutes, within one minute, within 10 seconds, and/or within 1 second) of the aircraft (e.g., 102E) receiving the lead aircraft assignment instruction, wherein the second aircraft (e.g., 102F) begins recording the track of the lead aircraft (e.g., 102D) within one minute of the aircraft (e.g., 102E) beginning to record the track of the lead aircraft (e.g., 102D).

In some embodiments, where there is a train (e.g., 106-1) including two or more follower aircraft (e.g., aircraft 102B and second aircraft 102C) and a lead aircraft (e.g., 102A), each of the two or more follower aircraft (e.g., 102B and 102C) may include a processor 402 of a computing device 210A. For example, the processor 402 (e.g., a second aircraft processor) of the second follower aircraft (e.g., 102C) may be configured to: receive a second lead aircraft assignment instruction from the ATC, the second lead aircraft assignment instruction further instructing the second aircraft (e.g., 102C) to follow the aircraft (e.g., 102B) assigned in the second lead aircraft assignment instruction; determine whether the second aircraft (e.g., 102C) is receiving sufficient aircraft traffic data from the aircraft (e.g., 102B) to record an aircraft track of the aircraft (e.g., 102B); upon a determination that the second aircraft (e.g., 102C) is receiving the sufficient aircraft traffic data from the aircraft (e.g., 102B) to record the aircraft track of the aircraft (e.g., 102B), output an acceptance of the second lead aircraft assignment instruction for transmission to the ATC 104; receive the aircraft traffic data obtained from the aircraft (e.g., 102B), the aircraft traffic data including the information at least one of associated with or of the aircraft track of the aircraft (e.g., 102B), the aircraft track including the information of a ground track of the aircraft (e.g., 102B) at given times, altitudes of the aircraft (e.g., 102B) at the given times, and speeds of the aircraft (e.g., 102B) at the given times; record the aircraft track of the aircraft (e.g., 102B) based on the aircraft traffic data; and/or output commands, the commands configured to cause at least one of: (a) the second aircraft (e.g., 102C) to follow the recorded aircraft track of the aircraft (e.g., 102B), or (b) guidance content to be presented to a pilot (e.g., 202) of the second aircraft (e.g., 102C), the guidance content including information associated with guidance for following the recorded aircraft track of the aircraft (e.g., 102B).

Further, for example, the processor 402 of the computing device 210A may be configured to: receive an instruction from air traffic control (ATC) 104, the instruction instructing the aircraft (e.g., 102A, 102B, 102C, 102D, 102E, or 102F) to follow a virtual lead aircraft assigned in the instruction; output an acceptance of the instruction for transmission to the ATC 104; obtain virtual lead aircraft track data (e.g., from the computing device 210C, the memory 404 and/or the storage 406 of the computing device 210A, and/or the ATC 104), the virtual lead aircraft data including information at least one of associated with or of a track of the virtual lead aircraft, the track including information of a ground track of the virtual lead aircraft at given times, altitudes of the virtual lead aircraft at the given times, and speeds of the virtual lead aircraft at the given times; and/or output commands, the commands configured to cause at least one of: (a) the aircraft (e.g., 102A, 102B, 102C, 102D, 102E, or 102F) to follow the track of the virtual lead aircraft, or (b) guidance content to be presented to a pilot (e.g., 202) of the aircraft (e.g., 102A, 102B, 102C, 102D, 102E, or 102F), the guidance content including information associated with guidance for following the track of the virtual lead aircraft.

The computing device 210B may be implemented as any suitable computing device, such as an autopilot computing device. As shown in FIG. 4, the computing device 2106 may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an autopilot application) or computer code stored (e.g., maintained) in a non-transitory computer-readable medium (e.g., memory 404 and/or storage 406) and configured to execute various instructions or operations. The processor 402 of the computing device 210B may be configured to perform any or all of the operations disclosed throughout. For example, the processor 402 of the computing device 2106 may be configured to: receive commands configured to cause the aircraft (e.g., 102B, 102C, 102E, or 102F) to follow the recorded track of the lead aircraft (e.g., 102A or 102D); and/or cause the aircraft (e.g., 102B, 102C, 102E, or 102F) to follow the recorded track of the lead aircraft (e.g., 102A or 102D). Additionally, for example, the processor 402 of the computing device 210B may be configured to: receive commands configured to cause the aircraft (e.g., 102A, 102B, 102C, 102D, 102E, or 102F) to follow the track of the virtual lead aircraft; and/or cause the aircraft (e.g., 102A, 102B, 102C, 102D, 102E, or 102F) to follow the track of the virtual lead aircraft. Similarly, for example, the processor 402 of the computing device 210B may be configured to: cause the aircraft (e.g., 102A, 102B, 102C, 102D, 102E, or 102F) to follow the track of one of the lead aircraft (e.g., 102A or 102D) or the virtual lead aircraft with a specified separation to maintain between the aircraft (e.g., 102A, 102B, 102C, 102D, 102E, or 102F) and the one of the lead aircraft (e.g., 102A or 102D) or the virtual lead aircraft.

The computing device 210C may be implemented as any suitable computing device, such as a track database computing device. As shown in FIG. 4, the computing device 210C may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., a database application) or computer code stored (e.g., maintained) in a non-transitory computer-readable medium (e.g., memory 404 and/or storage 406) and configured to execute various instructions or operations. The processor 402 of the computing device 210C may be configured to perform any or all of the operations disclosed throughout. For example, the processor 402 of the computing device 210C may be configured to store and output data associated with a plurality of commonly used virtual lead aircraft and virtual lead aircraft track data associated with the commonly used virtual lead aircraft (e.g., both of said data may be stored in the memory 404 and/or storage 406 of the computing device 210C) to the computing device 210A.

The communications and/or surveillance equipment 212 may be any suitable communications and/or surveillance equipment configured to transmit and/or receive communications (e.g., data and/or voice) (a) to and/or from at least one other aircraft (e.g., 102A, 102B, 102C, 102D, 102E, and/or 102F), (b) to and/or from at least one ATC 104, and/or (c) to and/or from another offboard site (e.g., a remote pilot ground station). For example, the communications and/or surveillance equipment 212 may include any or all of the following: at least one ADS-B transceiver 214 (e.g., at least one ADS-B transmitter and/or at least one ADS-B receiver); at least one radio 216; at least one ADS-Contract (ADS-C) transceiver 218 (e.g., at least one ADS-C transmitter and/or at least one ADS-C receiver); at least one controller-pilot data link communications (CPDLC) radio 220; and/or any other communications and/or surveillance equipment commonly installed in aircraft (e.g., 102A, 102B, 102C, 102D, 102E, or 102F). For example, the communications and/or surveillance equipment 212 (e.g., the ADS-B transceiver 214, the radios 216, the ADS-C transceiver 218, and/or the CPDLC radio 220) may be configured to: transmit and/or receive a lead aircraft assignment instruction(s); transmit and/or receive an instruction(s) (e.g., as CPDLC data); transmit and/or receive an acceptance(s) of the lead aircraft assignment instruction(s) (e.g., as CPDLC data); transmit and/or receive an acceptance(s) of the instruction(s) (e.g., as CPDLC data); transmit and/or receive aircraft traffic data (e.g., the lead aircraft traffic data, which may be ADS-B data and/or ADS-C data); and/or transmit and/or receive virtual lead aircraft track data. For example, a follower aircraft (e.g., 102B, 102C, 102E, or 102F) can perform an MTS clearance by using an ADS-B in receiver or by receiving 4D track information of a lead aircraft (e.g., 102A or 102D) from ATC 104 via a datalink. For example, a lead aircraft (e.g., 102A or 102D) can broadcast 4D track information via ADS-B out or via a datalink, such as an ADS-C datalink. For example, the follower aircraft (e.g., 102B, 102C, 102E, or 102F) can receive an MTS clearance from the ATC 104, such as by a voice radio or a CPDLC datalink. For example, the lead aircraft (e.g., 102A or 102D) may be configured for ADS-B out or ADS-C (via datalink) to broadcast the 4D track information. For example, the follower aircraft (e.g., 102B, 102C, 102E, or 102F) may be configured for ADS-B in or to receive 4D track information via a CPDLC datalink, as well as being configured to receive the MTS clearance, such as by voice radio or CPDLC datalink. For example, where the lead aircraft is a virtual aircraft, the follower aircraft (e.g., 102A, 102B, 102C, 102D, 102E, or 102F) may receive virtual 4D track information via CPDLC datalink from ATC 104.

Referring still to FIGS. 2-4, for example, at least one processor (e.g., the at least one processor 304, the at least one processor 402 of the computing device 210A, the at least one processor 402 of the computing device 210B, and/or the at least one processor 402 of the computing device 210C) may be configured to perform (e.g., collectively perform, if more than one processor) any or all of the operations disclosed throughout.

Figure 5:
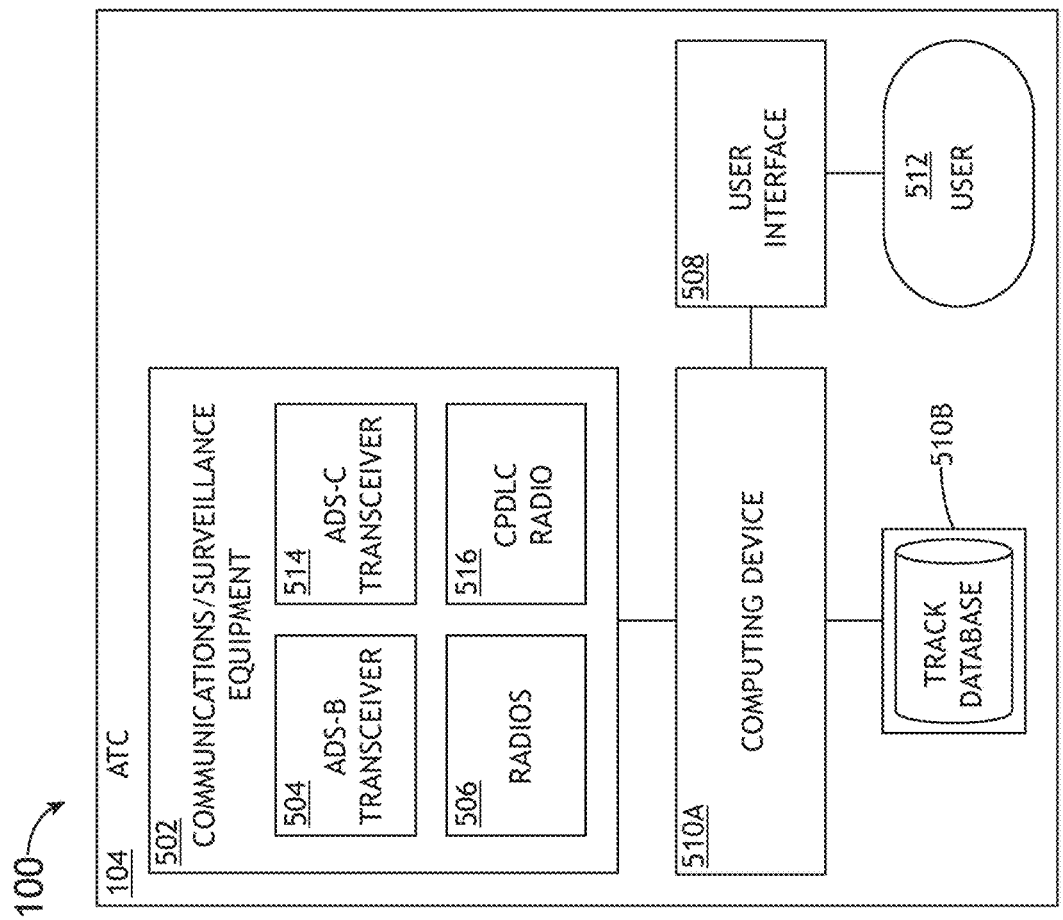
FIG. 5 is a view of exemplary embodiment of the ATC of FIG. 1 according to the inventive concepts disclosed herein.
Figure 6:
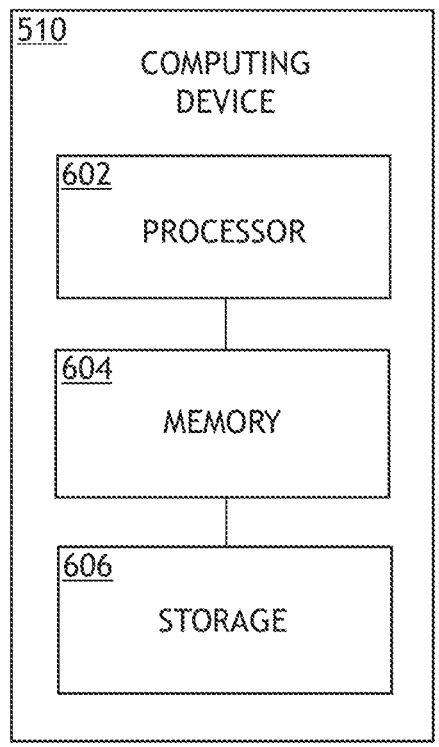
FIG. 6 is a view of an exemplary embodiment of a computing device of FIG. 5 according to the inventive concepts disclosed herein.

For example, as shown in FIGS. 5 and 6, one, some, or all of the ATC may include communications and/or surveillance equipment 502, at least one computing device 510A, at least one computing device 510B, at least one user interface 508, at least one user 512, and/or at least one data network switch (not shown; e.g., may be similar to 218), some or all of which may be communicatively coupled at any given time, such as via the data network switch. In some embodiments, the at least one computing device 510A and/or the at least one computing device 510B may be implemented as a single computing device or any number of computing devices configured to perform any or all of the operations disclosed throughout.

The communications and/or surveillance equipment 502 may be any suitable communications and/or surveillance equipment configured to transmit and/or receive communications (e.g., data and/or voice) (a) to and/or from at least one aircraft (e.g., 102A, 102B, 102C, 102D, 102E, and/or 102F), (b) to and/or from at least one other ATC 104, and/or (c) to and/or from another offboard site (e.g., a remote pilot ground station). For example, the communications and/or surveillance equipment 502 may include any or all of the following: at least one ADS-B transceiver 504 (e.g., at least one ADS-B transmitter and/or at least one ADS-B receiver); at least one radio 506; at least one ADS-C transceiver 514 (e.g., at least one ADS-C transmitter and/or at least one ADS-C receiver); at least one CPDLC radio 516; and/or any other communications and/or surveillance equipment commonly installed in an ATC 104. For example, the communications and/or surveillance equipment 502 (e.g., the ADS-B transceiver 504, the ADS-C transceiver 514, CPDLC radio 516, and/or the radios 506) may be configured to: transmit and/or receive a lead aircraft assignment instruction(s) (e.g., as CPDLC data); transmit and/or receive an instruction(s) (e.g., as CPDLC data); transmit and/or receive an acceptance(s) of the lead aircraft assignment instruction(s) (e.g., as CPDLC data); transmit and/or receive an acceptance(s) of the instruction(s) (e.g., as CPDLC data); transmit and/or receive aircraft traffic data (e.g., the lead aircraft traffic data, which may be ADS-B data and/or ADS-C data); and/or transmit and/or receive virtual lead aircraft track data. For example, a follower aircraft (e.g., 102B, 102C, 102E, or 102F) can perform an MTS clearance by using an ADS-B in receiver or by receiving 4D track information of a lead aircraft (e.g., 102A or 102D) from ATC 104 via a datalink. For example, a lead aircraft (e.g., 102A or 102D) can broadcast 4D track information via ADS-B out or via a datalink, such as an ADS-C datalink. For example, the follower aircraft (e.g., 102B, 102C, 102E, or 102F) can receive an MTS clearance from the ATC 104, such as by a voice radio or a CPDLC datalink. For example, the lead aircraft (e.g., 102A or 102D) may be configured for ADS-B out or ADS-C (via datalink) to broadcast the 4D track information. For example, the follower aircraft (e.g., 102B, 102C, 102E, or 102F) may be configured for ADS-B in or to receive 4D track information via a CPDLC datalink, as well as being configured to receive the MTS clearance, such as by voice radio or CPDLC datalink. For example, where the lead aircraft is a virtual aircraft, the follower aircraft (e.g., 102A, 102B, 102C, 102D, 102E, or 102F) may receive virtual 4D track information via CPDLC datalink from ATC 104.

The computing device 510A may be implemented as any suitable computing device. As shown in FIG. 6, the computing device 510A may include the elements of the computing device 510 and may include at least one processor 602, at least one memory 604, and/or at least one storage 606, some or all of which may be communicatively coupled at any given time. For example, the at least one processor 602 may include at least one general purpose processor (e.g., at least one central processing unit (CPU)), at least one digital signal processor (DSP), at least one application specific integrated circuit (ASIC), and/or at least one field-programmable gate array (FPGA). The processor 602 may be configured to run various software applications or computer code stored (e.g., maintained) in a non-transitory computer-readable medium (e.g., memory 604 and/or storage 606) and configured to execute various instructions or operations. The processor 602 of the computing device 510A may be configured to perform any or all of the operations disclosed throughout. For example, the processor 602 of the computing device 510A may be configured to: output a lead aircraft assignment instruction(s); output an instruction(s); receive an acceptance(s) of the lead aircraft assignment instruction(s); receive an acceptance(s) of the instruction(s); output and/or receive aircraft traffic data; and/or output and/or receive virtual lead aircraft track data.

For example, the processor 602 of the computing device 510A may be configured to: select the lead aircraft (e.g., 102A or 102D) for a lead aircraft assignment instruction from a group of possible lead aircraft (e.g., 102A or 102D) based at least on at least one of: departure location, departure time, arrival location, arrival time, navigational capabilities, flight capabilities, or aircraft size; output the lead aircraft assignment instruction for transmission to the aircraft (e.g., 102B, 102C, 102E, or 102F); and/or receive an acceptance of the lead aircraft assignment instruction from the aircraft (e.g., 102B, 102C, 102E, or 102F). In some embodiments, the processor 602 of the computing device 510A may be configured to: select the lead aircraft (e.g., 102A or 102D) prior to the lead aircraft (e.g., 102A or 102D) departing. In some embodiments, wherein the aircraft (e.g., 102B, 102C, 102E, or 102F) is one of at least two follower aircraft (e.g., 102B, 102C, 102E, and/or 102F) to sequentially follow the lead aircraft (e.g., 102A or 102D) along the track of the lead aircraft (e.g., 102A or 102D), wherein the at least one ATC processor (e.g., 602) may be further configured to: determine an order for the at least two follower aircraft (e.g., 102B, 102C, 102E, or 102F) to sequentially follow the lead aircraft (e.g., 102A or 102D) along the track of the lead aircraft (e.g., 102A or 102D), wherein the lead aircraft assignment instruction instructs the aircraft (e.g., 102B, 102C, 102E, or 102F) to follow the track of the lead aircraft (e.g., 102A or 102D) with a specified separation to maintain between the aircraft (e.g., 102B, 102C, 102E, or 102F) and the lead aircraft (e.g., 102A or 102D) such that the specified separation comports with the determined order for the at least two follower aircraft (e.g., 102B, 102C, 102E, and/or 102F).

Additionally, for example, the processor 602 of the computing device 510A may be configured to: select a virtual lead aircraft from a group of possible virtual lead aircraft for an instruction from ATC 104, the instruction instructing an aircraft (e.g., 102A, 102B, 102C, 102D, 102E, or 102F) to follow the virtual lead aircraft assigned in the instruction; receive an acceptance of the instruction from the aircraft (e.g., 102A, 102B, 102C, 102D, 102E, or 102F); and/or obtain (e.g., from the computing device 510B) and/or output virtual lead aircraft track data for transmission to the aircraft (e.g., 102A, 102B, 102C, 102D, 102E, or 102F). In some embodiments, the virtual lead aircraft may be based on a real previous aircraft recorded or obtained by the ATC 104. In some embodiments, the virtual lead aircraft may be associated with a 4D track computationally synthesized (e.g., by a computing device (e.g., 510A and/or 510B)) by the ATC 104.

The computing device 510B may be implemented as any suitable computing device, such as a track database computing device. As shown in FIG. 6, the computing device 510B may include the elements of the computing device 510 and may include at least one processor 602, at least one memory 604, and/or at least one storage 606, some or all of which may be communicatively coupled at any given time. For example, the at least one processor 602 may include at least one general purpose processor (e.g., at least one central processing unit (CPU)), at least one digital signal processor (DSP), at least one application specific integrated circuit (ASIC), and/or at least one field-programmable gate array (FPGA). The processor 602 may be configured to run various software applications (e.g., a database application) or computer code stored (e.g., maintained) in a non-transitory computer-readable medium (e.g., memory 604 and/or storage 606) and configured to execute various instructions or operations. The processor 602 of the computing device 510B may be configured to perform any or all of the operations disclosed throughout. For example, the processor 602 of the computing device 510B may be configured to store and output data associated with a plurality of commonly used virtual lead aircraft and virtual lead aircraft track data associated with the commonly used virtual lead aircraft (e.g., both of said data may be stored in the memory 404 and/or storage 406 of the computing device 210C) to the computing device 510A.

Referring still to FIGS. 5-6, for example, at least one processor (e.g., the at least one processor 602 of the computing device 510A and/or the at least one processor 602 of the computing device 510B) may be configured to perform (e.g., collectively perform, if more than one processor) any or all of the operations disclosed throughout.

Referring again to FIG. 5, the user 512 may be an air traffic controller a remote pilot, and/or a remote crew member. The user 512 may be configured to interface with the system via the user interface 508, for example, to approve, disapprove, engage, disengage, terminate, and/or override MTS clearance and/or MTS operations, and/or to instruct, acknowledge, accept, or reject lead aircraft assignment instructions to be sent from ATC 104. The at least one user interface 508 may be implemented as any suitable user interface, such as a touchscreen (e.g., of a display unit computing device (e.g., which may be similar to 206), a multipurpose control panel, a cursor control panel, a keyboard, a mouse, a trackpad, a button, a switch, an eye tracking system, and/or a voice recognition system. The user interface 508 may be configured to receive a user selection and to output the user selection to at least one computing device (e.g., 510A and/or 510B).

Referring again to FIGS. 1-6, for example, at least one processor (e.g., the at least one processor 304, the at least one processor 402 of the computing device 210A, the at least one processor 402 of the computing device 210B, and/or the at least one processor 402 of the computing device 210C, the at least one processor 602 of the computing device 510A and/or the at least one processor 602 of the computing device 510B) may be configured to perform (e.g., collectively perform, if more than one processor) any or all of the operations disclosed throughout.

Referring now to FIG. 7, an exemplary embodiment of an exemplary view 702 of a flight map according to the inventive concepts disclosed herein is depicted. The view 702 may include a flight plan for an aircraft (e.g., 102) and a plurality of waypoints 704. The flight map may utilize a multi-function window (MFW) map window. In this example, the lead aircraft (e.g., 102A or 102D) started near a given waypoint (e.g., Northbrook Illinois airport (OBK) very high frequency (VHF) navigational facility-omnidirectional course only (OBK VOR)) and landed on the north runway at a second waypoint (e.g., Chicago O'Hare International Airport (KORD)). In some embodiments, the waypoint 704 symbols may be shown when a heading command changed, an altitude changed, and/or a speed changed. For example, the follower aircraft (e.g., 102B, 102C, 102E, or 102F) may use this information to replicate a 4D track of the lead aircraft (e.g., 102A or 102D). In some embodiments, recording the track of the lead aircraft (e.g., 102A or 102D) allows for a much higher number of track locations (e.g., waypoints 704) to be captured to nearly duplicate the track of the lead aircraft (e.g., 102A or 102D), and the number may be generally much higher than found in a typical uplinked flight plan procedure that was manually defined by an Air Traffic Controller. As shown in FIG. 7, the waypoints 704 (denoted as MTS_1 through MTS_9) denote waypoints where the follower aircraft (e.g., 102B, 102C, 102E, or 102F) is to operate according to MTS between such waypoints 704. Once the follower aircraft arrives at waypoint 704 MTS_9, the follower may terminate MTS to begin an approach procedure. In some embodiments, the follower aircraft may receive MTS clearance that terminates when reaching a final approach fix (e.g., waypoint 704 MTS_9) to the runway for traditional piloted aircraft, and for example, the final approach may transition to a database and/or published approach procedure no later than when the heading would intercept the final approach course at an acceptable angle.

Figure 8:
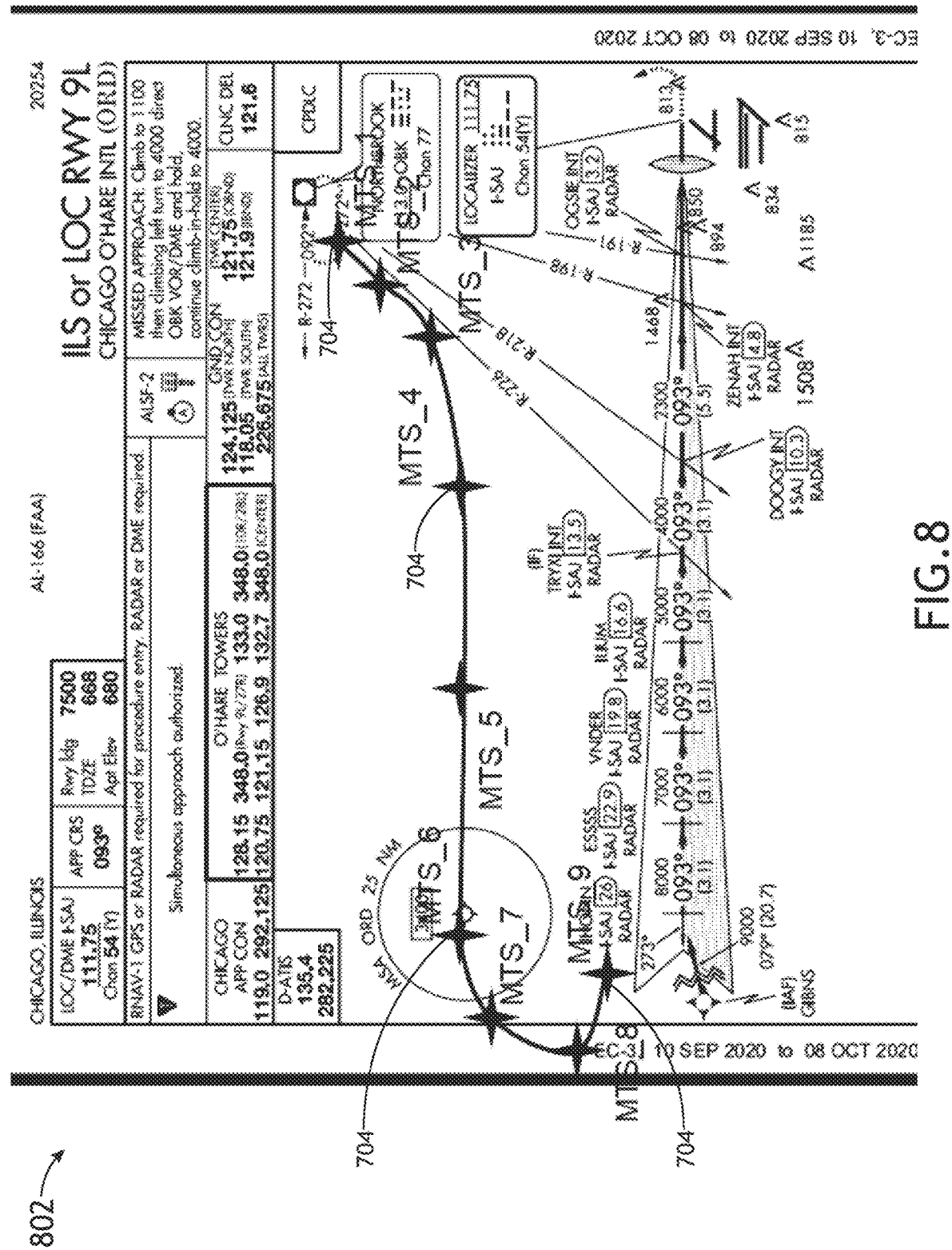
FIG. 8 is a further exemplary view of a flight map of an exemplary embodiment according to the inventive concepts disclosed herein.

Referring now to FIG. 8, an exemplary embodiment of an exemplary approach plate view 802 of a flight map according to the inventive concepts disclosed herein is depicted. The view 802 may include a flight plan for an aircraft (e.g., 102) and a plurality of waypoints 704. The flight map may utilize a multi-function window (MFW) map window. For example, if the view 702 of FIG. 7 changed to an approach plate at waypoint 704 (e.g., MTS_5), the view 702 may change to the view 802 of FIG. 8.

Referring now to FIG. 9, an exemplary embodiment of an exemplary view of a legs table that corresponds to the view 702 of FIG. 7 according to the inventive concepts disclosed herein is depicted. As shown in the table, MSN refers to Madison, Wisconsin VOR station. As shown in the table, ILS 9L refers to Instrument Landing System runway 9L approach clearance. The example approach is the ORD ILS runway 9L approach.

Referring again to FIGS. 7 and 9, if the lead aircraft (e.g., 102A or 102D) has not yet reached a desired end point of the MTS procedure, then the follower aircraft (e.g., 102B, 102C, 102E, or 102F) may treat the entire clearance as being on automated "radar vectors" mimicking a lead aircraft until MTS is either cancelled or superseded by another clearance (e.g. ILS 9L). In either case, upon reaching a last recorded waypoint, a last altitude, heading and speed may be maintained until overridden by new clearance parameters.

In some embodiments, enhanced controller-pilot data link communications (CPDLC) (e.g., via CPDLC radio 220 and/or the CPDLC radio 516) may be utilized. CPDLC is a two-way data-link system by which controllers can transmit non urgent strategic messages to an aircraft as an alternative to voice communications. The CPDLC message is displayed on a flight deck visual display. For example, the follower aircraft (e.g., 102B, 102C, 102E, or 102F) may be required to confirm that the follower aircraft (e.g., 102B, 102C, 102E, or 102F) has recorded a track of the lead aircraft (e.g., 102A or 102D) adequately to perform a follow function (e.g., an MTS function), or confirm an uplink of a desired 4D trajectory information (e.g., virtual lead aircraft track data). A point where to start following (e.g., performing MTS operations) can either be a current location of the lead aircraft (e.g., 102A or 102D) or at another location earlier in a track as defined by the air traffic controller.

Some embodiments, for example involving UAVs or drones, may enable a remote pilot to operate the first drone, and the other drones may then mimic the flight of the first drone in 4D with a time offset between the drones. This may offer a means by which trains of drones can be remote piloted from one point to another, while offering an ability to dynamically create and/or begin new routes (e.g., which may be stored onboard each of the drones) as needed by flying a single drone on a new route.

Figure 10:
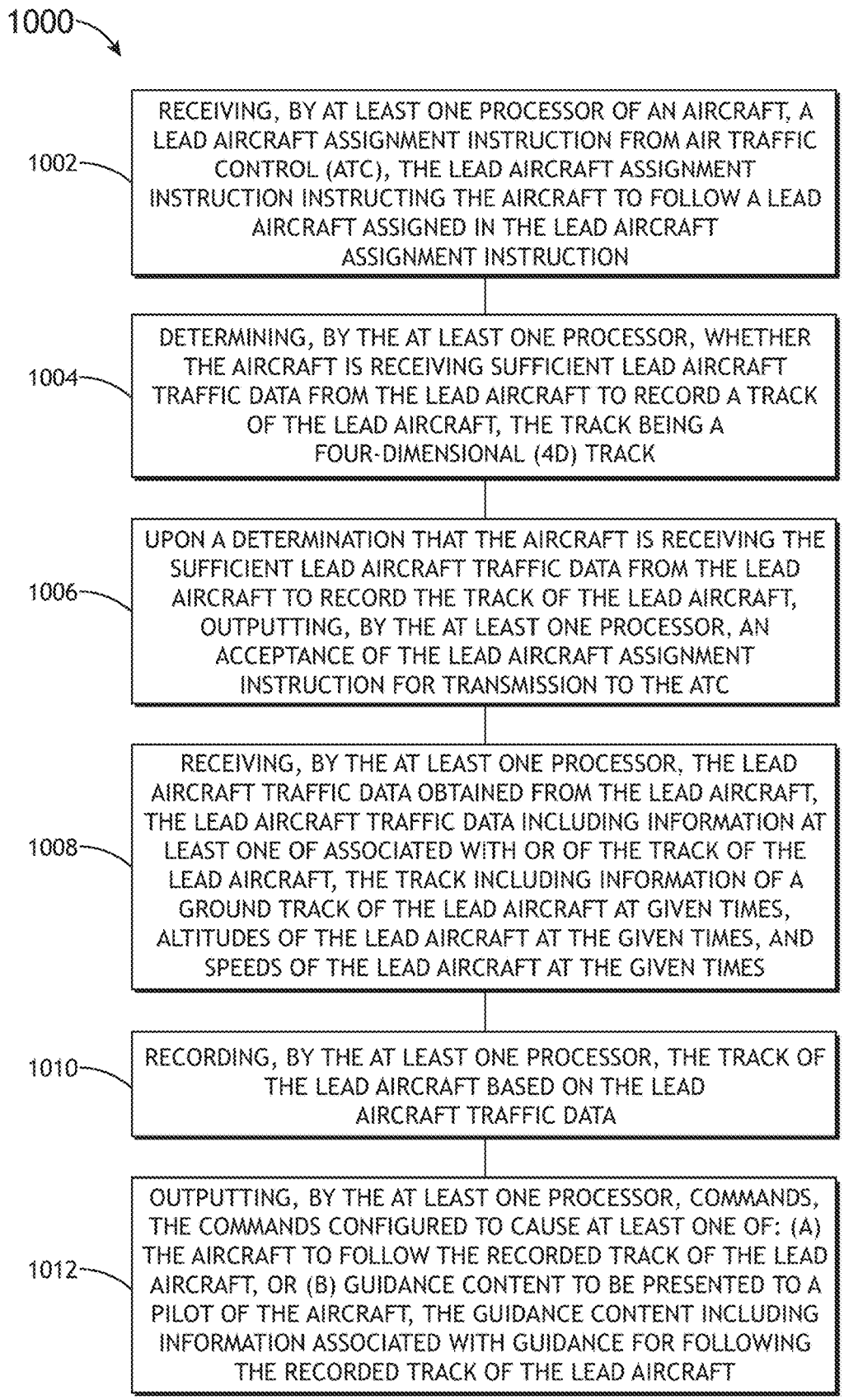
FIG. 10 is a diagram of an exemplary embodiment of a method according to the inventive concepts disclosed herein.

Referring now to FIG. 10, an exemplary embodiment of a method 1000 according to the inventive concepts disclosed herein may include one or more of the following steps. Additionally, for example, some embodiments may include performing one or more instances of the method 1000 iteratively, concurrently, and/or sequentially. Additionally, for example, at least some of the steps of the method 1000 may be performed in parallel and/or concurrently. Additionally, in some embodiments, at least some of the steps of the method 1000 may be performed non-sequentially.

A step 1002 may include receiving, by at least one processor of an aircraft, a lead aircraft assignment instruction from air traffic control (ATC), the lead aircraft assignment instruction instructing the aircraft to follow a lead aircraft assigned in the lead aircraft assignment instruction.

A step 1004 may include determining, by the at least one processor, whether the aircraft is receiving sufficient lead aircraft traffic data from the lead aircraft to record a track of the lead aircraft, the track being a four-dimensional (4D) track.

A step 1006 may include upon a determination that the aircraft is receiving the sufficient lead aircraft traffic data from the lead aircraft to record the track of the lead aircraft, outputting, by the at least one processor, an acceptance of the lead aircraft assignment instruction for transmission to the ATC.

A step 1008 may include receiving, by the at least one processor, the lead aircraft traffic data obtained from the lead aircraft, the lead aircraft traffic data including information at least one of associated with or of the track of the lead aircraft, the track including information of a ground track of the lead aircraft at given times, altitudes of the lead aircraft at the given times, and speeds of the lead aircraft at the given times.

A step 1010 may include recording, by the at least one processor, the track of the lead aircraft based on the lead aircraft traffic data.

A step 1012 may include outputting, by the at least one processor, commands, the commands configured to cause at least one of: (a) the aircraft to follow the recorded track of the lead aircraft, or (b) guidance content to be presented to a pilot of the aircraft, the guidance content including information associated with guidance for following the recorded track of the lead aircraft.

Further, the method 1000 may include any of the operations disclosed throughout.

Figure 11:
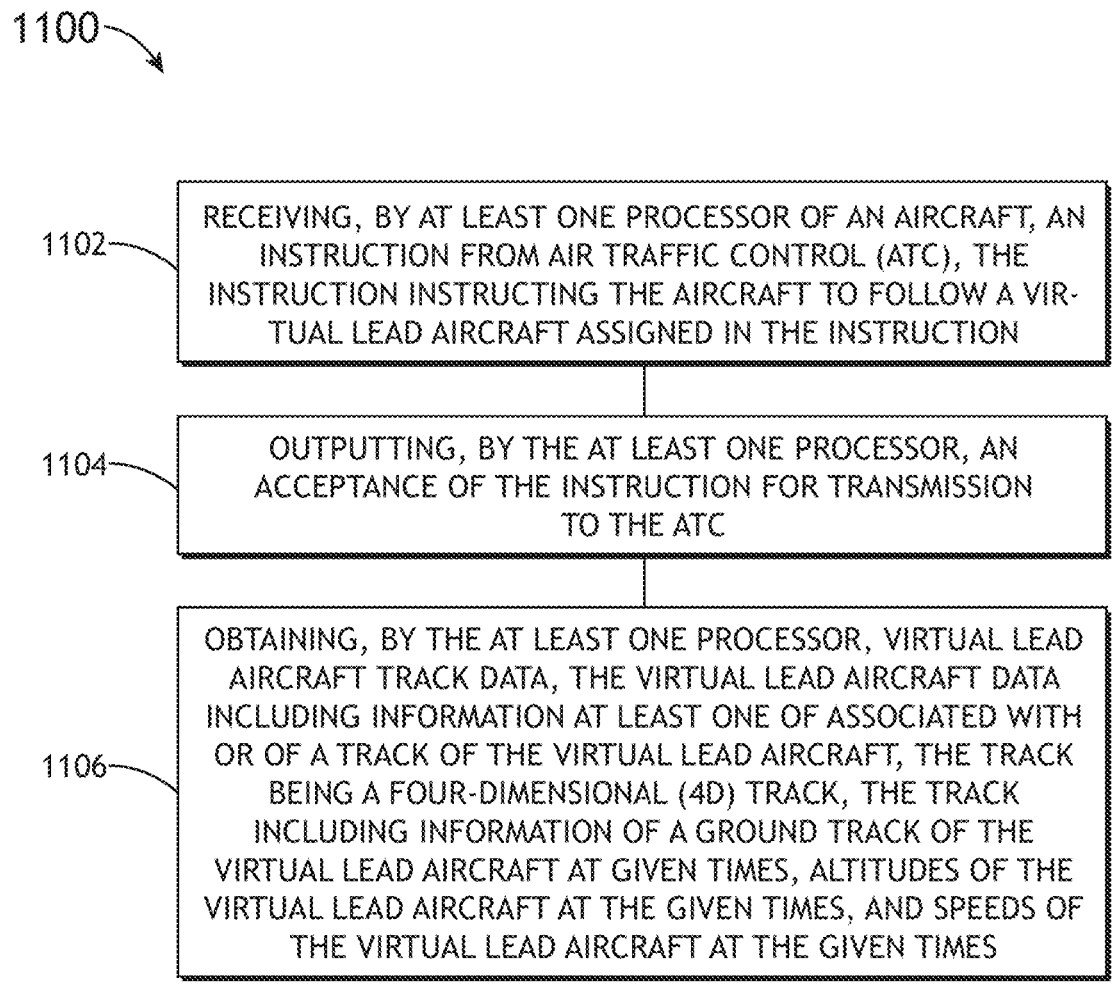
FIG. 11 is a diagram of an exemplary embodiment of a method according to the inventive concepts disclosed herein.

Referring now to FIG. 11, an exemplary embodiment of a method 1100 according to the inventive concepts disclosed herein may include one or more of the following steps. Additionally, for example, some embodiments may include performing one or more instances of the method 1100 iteratively, concurrently, and/or sequentially. Additionally, for example, at least some of the steps of the method 1100 may be performed in parallel and/or concurrently. Additionally, in some embodiments, at least some of the steps of the method 1100 may be performed non-sequentially.

A step 1102 may include receiving, by at least one processor of an aircraft, an instruction from air traffic control (ATC), the instruction instructing the aircraft to follow a virtual lead aircraft assigned in the instruction.

A step 1104 may include outputting, by the at least one processor, an acceptance of the instruction for transmission to the ATC.

A step 1106 may include obtaining, by the at least one processor, virtual lead aircraft track data, the virtual lead aircraft data including information at least one of associated with or of a track of the virtual lead aircraft, the track being a four-dimensional (4D) track, the track including information of a ground track of the virtual lead aircraft at given times, altitudes of the virtual lead aircraft at the given times, and speeds of the virtual lead aircraft at the given times.

A step 1108 may include outputting, by the at least one processor, commands, the commands configured to cause at least one of: (a) the aircraft to follow the track of the virtual lead aircraft, or (b) guidance content to be presented to a pilot of the aircraft, the guidance content including information associated with guidance for following the track of the virtual lead aircraft.

Further, the method 1100 may include any of the operations disclosed throughout.

As will be appreciated from the above, embodiments of the inventive concepts disclosed herein may be directed to a system and a method configured to cause (a) an aircraft to follow a track of a lead aircraft (e.g., a real lead aircraft or a virtual lead aircraft), and/or (b) guidance content to be presented to a pilot of the aircraft, the guidance content including information associated with guidance for following the track of the lead aircraft.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
an aircraft, comprising:
at least one processor configured to:
receive a lead aircraft assignment instruction from air traffic control (ATC), the lead aircraft assignment instruction instructing the aircraft to follow a lead aircraft assigned in the lead aircraft assignment instruction;
determine whether the aircraft is receiving sufficient lead aircraft traffic data from at least one of the lead aircraft or the ATC to record a track of the lead aircraft, the track being a four-dimensional (4D) track;
upon a determination that the aircraft is receiving the sufficient lead aircraft traffic data from the at least one of the lead aircraft or the ATC to record the track of the lead aircraft, output an acceptance of the lead aircraft assignment instruction for transmission to the ATC;
receive the lead aircraft traffic data from the at least one of the lead aircraft or the ATC, the lead aircraft traffic data including information at least one of associated with or of the track of the lead aircraft, the track including information of a ground track of the lead aircraft at given times, altitudes of the lead aircraft at the given times, and speeds of the lead aircraft at the given times;
record the track of the lead aircraft based on the lead aircraft traffic data; and
output commands, the commands configured to cause at least one of: (a) the aircraft to follow the recorded track of the lead aircraft, or (b) guidance content to be presented to a pilot of the aircraft, the guidance content including information associated with guidance for following the recorded track of the lead aircraft; and a second aircraft, comprising:
at least one second aircraft processor configured to:
receive a second lead aircraft assignment instruction from the ATC, the second lead aircraft assignment instruction instructing the second aircraft to follow the lead aircraft assigned in the second lead aircraft assignment instruction;
determine whether the second aircraft is receiving sufficient lead aircraft traffic data from the at least one of the lead aircraft or the ATC to record the track of the lead aircraft;
upon a determination that the second aircraft is receiving the sufficient lead aircraft traffic data from the at least one of the lead aircraft or the ATC to record the track of the lead aircraft, output an acceptance of the second lead aircraft assignment instruction for transmission to the ATC;
receive the lead aircraft traffic data obtained from the at least one of the lead aircraft or the ATC, the lead aircraft traffic data including the information at least one of associated with or of the track of the lead aircraft, the track including the information of the ground track of the lead aircraft at the given times, the altitudes of the lead aircraft at the given times, and the speeds of the lead aircraft at the given times;
record the track of the lead aircraft based on the lead aircraft traffic data; and
output commands, the commands configured to cause at least one of: (a) the second aircraft to follow the recorded track of the lead aircraft, or (b) guidance content to be presented to a pilot of the second aircraft, the guidance content including information associated with guidance for following the recorded track of the lead aircraft.

2. The system of claim 1, wherein the lead aircraft traffic data is or comprises at least one of automatic dependent surveillance-broadcast (ADS-B) data or ADS-Contract (ADS-C) data.

3. The system of claim 1, wherein the at least one processor is further configured to terminate output of the commands upon at least one of a manual intervention or an assignment of a new lead aircraft.

4. The system of claim 1, wherein the at least one processor is further configured to terminate output of the commands upon a transition to a different flight procedure.

5. The system of claim 4, wherein the different flight procedure is an approach procedure.

6. The system of claim 1, wherein the lead aircraft assignment instruction further instructs the aircraft to follow the track of the lead aircraft with a specified separation to maintain between the aircraft and the lead aircraft, wherein the commands are further configured to cause at least one of: (a) the aircraft to follow the recorded track of the lead aircraft with the specified separation to maintain between the aircraft and the lead aircraft, or (b) guidance content to be presented to a pilot of the aircraft, the guidance content including information associated with guidance for following the recorded track of the lead aircraft with the specified separation to maintain between the aircraft and the lead aircraft.

7. The system of claim 6, wherein the lead aircraft assignment instruction further instructs the aircraft to begin following the recorded track of the lead aircraft at a specified location or to begin following a segment of the recorded track to another specified location.

8. The system of claim 6, wherein the specified separation is a specified time offset separation.

9. The system of claim 1, wherein the at least one processor comprises at least one flight management system (FMS) processor of an FMS computing device.

10. The system of claim 1, further comprising the ATC, the ATC comprising at least one ATC processor, wherein the at least one ATC processor is configured to: select the lead aircraft for the lead aircraft assignment instruction from a group of possible lead aircraft based at least on at least one of: departure location, departure time, arrival location, arrival time, navigational capabilities, flight capabilities, or aircraft size; and output the lead aircraft assignment instruction for transmission to the aircraft.

11. The system of claim 10, wherein the at least one ATC processor is further configured to select the lead aircraft prior to the lead aircraft departing.

12. The system of claim 10, wherein the aircraft is one of at least two follower aircraft to sequentially follow the lead aircraft along the track of the lead aircraft, wherein the at least one ATC processor is further configured to: determine an order for the at least two follower aircraft to sequentially follow the lead aircraft along the track of the lead aircraft, wherein the lead aircraft assignment instruction instructs the aircraft to follow the track of the lead aircraft with a specified separation to maintain between the aircraft and the lead aircraft such that the specified separation comports with the determined order for the at least two follower aircraft.

13. A system, comprising:
an aircraft, comprising:
at least one processor configured to:
receive a lead aircraft assignment instruction from air traffic control (ATC), the lead aircraft assignment instruction instructing the aircraft to follow a lead aircraft assigned in the lead aircraft assignment instruction;
determine whether the aircraft is receiving sufficient lead aircraft traffic data from at least one of the lead aircraft or the ATC to record a track of the lead aircraft, the track being a four-dimensional (4D) track;
upon a determination that the aircraft is receiving the sufficient lead aircraft traffic data from the at least one of the lead aircraft or the ATC to record the track of the lead aircraft, output an acceptance of the lead aircraft assignment instruction for transmission to the ATC;
receive the lead aircraft traffic data from the at least one of the lead aircraft or the ATC, the lead aircraft traffic data including information at least one of associated with or of the track of the lead aircraft, the track including information of a ground track of the lead aircraft at given times, altitudes of the lead aircraft at the given times, and speeds of the lead aircraft at the given times;
record the track of the lead aircraft based on the lead aircraft traffic data; and
output commands, the commands configured to cause at least one of: (a) the aircraft to follow the recorded track of the lead aircraft, or (b) guidance content to be presented to a pilot of the aircraft, the guidance content including information associated with guidance for following the recorded track of the lead aircraft; and a second aircraft, comprising:
  at least one second aircraft processor configured to:
    receive a second lead aircraft assignment instruction from the ATC, the second lead aircraft assignment instruction further instructing the second aircraft to follow the aircraft assigned in the second lead aircraft assignment instruction;
    determine whether the second aircraft is receiving sufficient aircraft traffic data from at least one of the aircraft or the ATC to record an aircraft track of the aircraft, the aircraft track being a 4D aircraft track;
    upon a determination that the second aircraft is receiving the sufficient aircraft traffic data from the at least one of the aircraft or the ATC to record the aircraft track of the aircraft, output an acceptance of the second lead aircraft assignment instruction for transmission to the ATC;
    receive the aircraft traffic data obtained from the at least one of the aircraft or the ATC, the aircraft traffic data including the information at least one of associated with or of the aircraft track of the aircraft, the aircraft track including the information of a ground track of the aircraft at given times, altitudes of the aircraft at the given times, and speeds of the aircraft at the given times;
    record the aircraft track of the aircraft based on the aircraft traffic data; and
    output commands, the commands configured to cause at least one of: (a) the second aircraft to follow the recorded aircraft track of the aircraft, or (b) guidance content to be presented to a pilot of the second aircraft, the guidance content including information associated with guidance for following the recorded aircraft track of the aircraft.

\* \* \* \* \*